United States Patent Office 3,329,657
Patented July 4, 1967

3,329,657
WATER SOLUBLE CROSS LINKED CATIONIC POLYAMIDE POLYAMINES
Edward Strazdins, Stamford, and Ronald Raymond House, Darien, Conn., assignors to American Cyanamid Company, Stamford, Conn., a corporation of Maine
No Drawing. Filed May 17, 1963, Ser. No. 281,321
7 Claims. (Cl. 260—78)

The present invention relates to a water-soluble storage-stable cross-linked cationic polymer useful in the manufacture of paper. The invention includes methods for the manufacture of the polymer, paper-making compositions containing the polymer, and processes for the manufacture of paper by separate addition of the polymer to paper-making fibrous suspensions.

The present invention rests upon the discovery that the polymer which is formed when a cross-linking agent is substantially completely reacted with a water-soluble substantially linear polyamidepolyamine, the amount of the cross-linking agent being sufficient to form a polymer which is cross-linked yet water-soluble, possesses a combination of properties that renders it valuable in the paper-making field. In preferred embodiments the polymer possesses these properties:

(1) The polymer contains substantially no reactive substituents. The polymer is therefore non-thermosetting and is intrinsically stable. It can therefore be stored in aqueous solution state for long periods of time and can be shipped as a high-solids aqueous solution over long distances at summer temperatures without gelling.

(2) The polymer possesses unusually high cationic density. The polymer is thus unusually effective on a weight-for-weight basis in the manufacture of paper as drainage aid, and as retention aid for pigments and emulsions.

(3) The polymer possesses a large proportion of secondary amine groups. It is thus particularly effective as animalizing agent for cellulose, and renders the cellulose substantive for acid dyes.

(4) The polymer acts as a catalyst, in that it greatly accelerates the rate at which certain cellulose-reactive sizes develop their water-resistance properties when employed in the manufacture of paper. The invention thus permits sizes such as octadecyl ketene dimer and distearic anhydride to develop a predominant part of their sizing within the time required to manufacture and dry paper in modern high-speed paper-making machines.

(5) The polymer produces little or no wet strength. As a result, broke from the process can be pulped in ordinary paper-making equipment, and a special pulping step in special pulping apparatus is not needed.

The polyamidepolyamines from which the polymers of the present invention are prepared are water-soluble, cationic, and substantially linear. They are prepared by heating a dibasic acid with a polyalkylenepolyamine at 150° C.–200° C. under anhydrous conditions as shown in Keim U.S. Patent No. 2,926,154 of Feb. 23, 1960. The resulting polyamidepolyamines, as prepared (that is, as substantially anhydrous melts) have viscosities between about 500 and 50,000 centipoises at 150° C.

Polyamidepolyamines in this viscosity range are freely water-soluble, and their aqueous solutions are not unduly viscous. For example, the viscosity of the polymer which has a viscosity as high as 50,000 centipoises as an anhydrous melt at 150° C. is less than 40 centipoises when the polymer is dissolved in sufficient water to form a 45% by weight solution.

Polyamidepolyamines which have a viscosity at 150° C. of 1000 to 3000 centipoises are preferred, experience having shown them to be less likely to gel during the cross-linking step which follows.

The dicarboxylic acids from which the polyamidepolyamines can be prepared include adipic acid, succinic acid, isophthalic acid, terephthalic acid, and glycollic acid, and mixtures thereof. These acids contribute

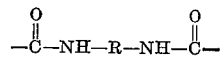

units to the polymer, which are the pairs of amide groups referred to below.

The polyalkylenepolyamines from which the polyamidepolyamines prepared include diethylenetriamine, tetraethylenepentamine, the corresponding polypropylenes, iminobispropylamine, and mixtures thereof. These compounds contribute basic amino groups to the polymer. In several comparable instances, we have found it preferable to employ a polyalkylenepolyamine which contains at least four basic amino groups, for example, triethylenetetramine or tetraethylenepentamine. Since two of the amino groups of the polyamine are consumed by reaction with the dicarboxylic acid, the polyamidepolyamine, when triethylenetetramine or tetraethylenepentamine is used, contains at least two basic amino groups therein, and is, therefore, more strongly cationic than when, for example, diethylenetriamine is used as the polyalkylenepolyamine.

The polymer of the present invention is prepared by cross-linking a polyamidepolyamine such as is described above in such manner that the cross-linking agent is substantially completely reacted, and yet the final polymer is water-soluble. The reaction proceeds in aqueous medium in the temperature range of 60°–80° C. The step of cross-linking the polyamidepolyamine requires careful control of the amount of cross-linking agent which is added and reacted. Up to the present, the step of cross-linking a polymer with complete reaction of the cross-linking agent has generally resulted in the formation of a gel, because the gel point arrives swiftly once the polyamidepolyamine units have been linked to high molecular weight.

The cross-linking agent is substantially completely reacted, that is, it is reacted to such extent that the resulting polymer solution does not gel when stored at 30° C. for 5 weeks as a 40% by weight aqueous solution. This is in excess of the time typically required for the polymer to be shipped and consumed. The polymer of the present invention thus contains substantially no amine-reactive substituents.

The amount of cross-linking agent which is employed depends chiefly upon the molecular size or viscosity of the parent polyamidepolyamine, a polyamidepolyamine of large molecular size requiring less cross-linking agent than a polyamidepolyamine of low molecular size.

A suitable amount of cross-linking agent in any instance may be found by laboratory trial as follows. Increments of the cross-linking agent are added to an aqueous solution of the polyamidepolyamine at reaction temperature and pH, and each increment is allowed to react with the polyamidepolyamine before the next is added. The optimum amount of cross-linking agent is that which yields a polymer which is close to but short of its gel point, so that the polymer is water-soluble but of maximum practical viscosity.

As a rule of thumb, we have found that in the case of polyamidepolyamines which have a viscosity in the range of 1,000–3,000 centipoises at 150° C., the optimum amount of cross-linking agent falls roughly within the range of 0.01–0.1 molecule of cross-linking agent per amino group in the molecule, so that between about 1% and 10% of the basic amino groups are cross-linked.

In general, any of the polyfunctional agents which have heretofore been used for the formation of cationic polymers from amines may be used to effect the cross-linking. Suitable agents which have been found suitable are glyoxal, 1,2-dichloroethane, divinyl sulfone, diallyl amine, epichlorohydrin, diallyl melamine, diglycidyl ether, methylenebisacrylamide, and acrolein.

The cross-linked polymers of the present invention find several uses in the manufacture of paper as is disclosed and claimed in copending application Ser. No. 545,872 filed on Apr. 28, 1966, by Strazdins and Kulick.

First, the polymer is useful as drainage aid and causes a substantial increase in the amount of water which drains from the fibers when they are laid on the Fourdrinier screen. For this purpose the polymer can be added to the paper-making fibrous suspension at any point before the wire, and preferably down-stream from the refining step. The amount to be added varies with the electrostatic character of the pulp and the extent of improvement desired. In practice, we have found suitable amounts to be generally between ½-ounce and 4 lb. of polymer per ton of pulp (dry basis).

Then, the polymer is useful as retention aid for particulate additaments used in paper-making.

Thus, in the case of pigments and non-ionic emulsions, the polymer is added to the paper-making fibrous suspension, most advantageously after the additament has been incorporated into the pulp. The polymer increases the proportion of the additament that would otherwise be retained by the fibers on sheeting.

In the case of cationic emulsions, the polymer may be added as a component of the emulsion, either as the sole cationic agent, or in conjunction with other cationic agents.

In the case of anionic emulsions, the polymer is added separately from the emulsion, either before or after.

The amount of polymer which is employed as retention aid for particulate additaments is generally larger than the amount which is needed as drainage aid. As much as 20 lb. of the polymer per ton of pulp (dry basis) or even more may be needed to effect retention of anionic emulsions wherein the weight of the emulsified material is 50%–100% of the dry weight of the fibers.

The optimum amount of polymer to be added in any one instance depends on unforeseeable variables such as the molecular weight of the polymer, its average cationic charge, the amount of additament material present, the electrostatic state of the additament material, and the chemical and physical properties of the cellulose paper-making fibers. The optimum amount in any one instance is, therefore, most conveniently found by laboratory trial.

The invention is further illustrated by the examples which follow. These examples are specific embodiments of the invention and are not to be construed in limitations thereof. In each example which illustrates use of the polymer in paper-making, unless otherwise stated, the polymer is added as a 1% by weight solution in water. Where materials are added in solvent or emulsion or emulsion form, percentages indicate the dry weight of the materials added based on the dry weight of the fibers.

*Example 1*

The following illustrates the preparation of a water-soluble, storage-stable, cross-linked cationic polymer according to the present invention.

A water-soluble cationic substantially linear polyamidepolyamine [substantially composed of

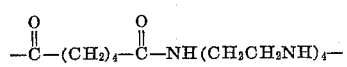

units] and having a viscosity in substantially anhydrous state at 150° C. of 1,200 centipoises [prepared by heating 237 g. (1.25 mols) of tetraethylenepentamine with 183 g. (1.25 mols) of adipic acid at 150° C. for about 2 hours] is mixed with sufficient water to form a 35% solution by weight and is stirred at 90° C. until dissolved. The viscosity of the solution at 80° C. is less than 10 centipoises. The polyamidepolyamine contains three secondary amine groups per pair of amide groups present therein.

There is then slowly added with stirring 21 g. (0.23 mol) of epichlorohydrin (about 85% of the total amount to be added), and when this has reacted (after about 90 minutes), 4.75 g. is added very slowly. After this increment has reacted, the reaction mixture at 35% polymer solids and at 80° C. has a viscosity of 100 centipoises. The total amount of epichlorohydrin added is 0.275 mol, equivalent to 0.09 mol of epichlorohydrin per amine nitrogen atom of the polyamidepolyamine. The solution is acidified to pH 4.4 by addition of concentrated hydrochloric acid and cooled to room temperature.

Paper is saturated with a 1% by weight aqueous solution of the foregoing polymer and is dried. The resulting paper is animalized and is readily dyed when immersed in a cold aqueous solution of Calcocid Alizarin Blue S.A.P.G. (an acid dye).

*Example 2*

The procedure of Example 1 is repeated except that 30.7 g. of 1,2-dichloroethane is employed as cross-linking agent in place of the epichlorohydrin of Example 1.

A similar polymer is obtained.

*Example 3*

The procedure of Example 1 is repeated except that 127.5 g. of diglycidyl ether is employed as cross-linking agent in place of the epichlorohydrin of Example 1.

Substantially the same polymer is obtained.

*Example 4*

The procedure of Example 1 is repeated except that 190 g. of methylenebisacrylamide

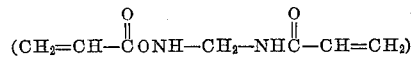

is used as cross-linking agent in place of the epichlorohydrin of Example 1.

Substantially the same polymer is obtained.

*Example 5*

The procedure of Example 1 is repeated except that 72.5 g. of glyoxal is employed as cross-linking agent in place of the epichlorohydrin of Example 1.

Substantially the same polymer is obtained.

*Example 6*

The procedure of Example 1 is repeated except that the polyamidepolyamine is prepared by use of 183 g. of triethylenetetramine in place of the tetraethylenepentamine. A similar polymer is obtained which contains two secondary amine groups per pair of amide groups.

*Example 7*

The procedure of Example 1 is repeated except that

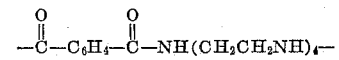

units are present, 207 g. (1.25 mols) of isophthalic acid being used in the preparation of this material in place of the adipic acid of Example 1.

Substantially the same polymer is obtained.

*Example 8*

The procedure of Example 1 is repeated except that the polyamidepolyamine is substantially composed of

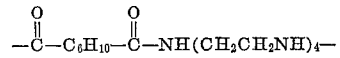

units, 215 g. of 1,4-hexanedicarboxylic acid (1.25 mols) being used in the preparation of this material in place of the adipic acid of Example 1.

Substantially the same polymer is obtained.

Example 9

The following illustrates a preferred process for the large scale manufacture of the polymer of the present invention.

The apparatus used is a 200-gal. steam-jacketed reactor having a stirrer, thermometer and discharge condenser.

Into the condenser is charged the polyamidepolyamine solution formed by reacting 183 lbs. (1.25 mols) of adipic acid with 237 lbs. (1.25 mols) of tetraethylenepentamine at about 154° C. until the reaction mixture has a viscosity of 1200 centipoises at 150° C., followed by the addition of sufficient water to form a solution containing 35% solids.

The contents of the reactor are heated to 80° C. There is then added 24.75 lbs. of epichlorohydrin (equivalent to 0.085 mol of epichlorohydrin per secondary amine group of the charge). The epichlorohydrin is added at such rate as to maintain an increase in viscosity of the reaction mixture of 0.75 centipoise per minute. There is then added 2.97 lbs. of epichlorohydrin in increments of successively smaller amount, each increment being allowed to react before the succeeding increment is added, so as to approach the gel point of the polymer as closely as is practical. The addition is stopped when the reaction mixture has a viscosity of 100 centipoises at 80° C.

The reaction mixture is adjusted to pH 4.4 by addition of 185 lbs. of 22° Bé HCl and is cooled to room temperature by admission of cooling water into the jacket.

Example 10

The following illustrates the utilization of the polymer of the present invention as drainage aid in the manufacture of paper.

An aqueous suspension of cellulose paper-making fibers having a Canadian standard freeness of 400 ml. is prepared having a neutral pH and a consistency of 0.6%. To this suspension is added 0.01% of the polymer of Example 1 (equivalent to 3 oz. of polymer per ton of the fibers). The polymer is added as a 0.5% solution in water. The suspension is stirred gently for a moment to distribute the polymer through the suspension and is then sheeted.

The rate at which the water drains through the suspension is very much greater than the rate at which the water drains through the suspension in the absence of the polymer, and paper of substantially equal properties is obtained.

Example 11

The following illustrates the effectiveness of the polymer of the present invention as aid for the retention of a highly particulate inorganic additament.

The procedure of the foregoing example is repeated except that 10% of titanium dioxide pigment (paper-making grade, based on the dry weight of the fibers) is added to the suspension as a 20% by weight slurry, and the amount of the polymer is increased to 15 oz. per ton of pulp.

Retention of the pigment by the fibers (which are sheeted at a basis weight of 50 lb. x 25" x 40"/500 ream) is greater than the amount which is retained when the polymer is omitted.

Example 12

The following illustrates the effectiveness of the polymer of the present invention as retention aid in cationic emulsions of organic additaments and as agent accelerating the rate at which hydrophobic organic cellulose-reacted sizes develop their sizing properties.

An emulsion is prepared by running 10 g. of molten octadecyl ketene dimer with vigorous agitation into a solution of 5 g. of the polymer of Example 1, 5 g. of a water-soluble cationic starch and 0.3 g. of sodium lignosulfonate in 140 g. of water at 85° C., homogenizing the resulting cationic emulsion, and rapidly cooling.

The procedure is repeated with use of distearic anhydride in place of the ketene dimer.

Control emulsions are prepared by repetition of the two procedures described above, with omission of the polymer.

The emulsions are tested by forming an aqueous suspension of cellulose paper-making fibers at a consistency of 0.6% and a pH of 6.3, adding thereto sufficient emulsion to provide in each instance 0.2% of the ketene dimer or distearic anhydride based on the dry weight of the fibers, sheeting the fibers to form paper, drying the paper at 110° F. until a high degree of sizing develops (five minutes for the stearic anhydride and 30 minutes for the ketene dimer), and determining the sizing values of the paper in standard laboratory manner using 20% aqueous lactic acid as the test fluid.

Results are as follows:

| Size | Sizing, Seconds | |
|---|---|---|
| | With Polymer | Without Polymer |
| Octadecyl ketene dimer [1] | 7,000 | 300 |
| Stearic anhydride [2] | 8,000 | 1,000 |

[1] Paper cured for 30 minutes at 100° F.
[2] Paper cured for 5 minutes at 110° F.

The results show that the amino polymer causes a major increase in the rate in which these agents develop their sizing, and that therefore the polymer possesses catalytic activity.

Example 13

The following illustrates the effectiveness of the polymer of the present invention as retention aid for an anionic emulsion of an organic additament.

To an aqueous suspension of cellulose paper-making fibers at pH 8 and at a consistency of 0.6% is added 0.5% of the polymer of Example 1. The suspension is gently stirred for a few minutes to permit adsorption of the polymer to proceed to completion, after which sufficient wax size (an aqueous anionic wax emulsion) is added to the suspension with gentle stirring to provide 3% of wax based on the dry weight of the fibers. The emulsion is uniformly deposited on the fibers by the action of the polymer.

We claim:

1. A water-soluble storage-stable cross-linked cationic polymer prepared by substantially completely reacting all the functionalities of a cross-linking agent with a water-soluble substantially linear polyamidepolyamine, the amount of said cross-linking agent being sufficient to form a polymer which is cross-linked yet water-soluble and which, as a 35% by weight solution in water at 80° C., has a viscosity of at least 50 centipoises, the amount of said cross-linking agent being in excess of about 0.01 mol per amino group in said polyamidepolyamine.

2. A polymer prepared by a method according to claim 1 wherein the substantially linear polyamidepolyamine in substantially anhydrous state at 150° C. before reaction with said cross-linking agent has a viscosity between 1,000 and 3,000 centipoises.

3. A polymer prepared by a method according to claim 1 wherein the linear polyamidepolyamine before reaction with said cross-linking agent contains at least two secondary amino groups per pair of amide groups therein.

4. A polymer prepared by a method according to claim 1 wherein the linear polyamidepolyamine before reaction with said cross-linking agent is substantially composed of units having the theoretical formula

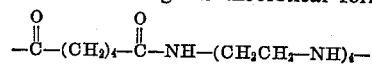

5. A polymer prepared by a method according to claim 1 wherein the cross-linking agent is reacted in amount sufficient to form a cross-linked polymer which has a viscosity of 75 to 300 centipoises as a 35% by weight solution in water at 80° C.

6. A polymer prepared by a method according to claim 1 wherein the cross-linking agent is epichlorhydrin.

7. A polymer prepared by a method according to claim 1 wherein the cross-linking agent is 1,2-dichloroethane.

References Cited

UNITED STATES PATENTS

| | | | |
|---|---|---|---|
| 2,926,154 | 2/1960 | Keim | 162—164 |
| 3,084,092 | 4/1963 | Arlt | 162—158 |
| 3,125,552 | 3/1964 | Loshaek et al. | 162—168 |
| 3,197,427 | 7/1965 | Schmalz | 260—79 |
| 3,215,654 | 11/1965 | Schmalz | 260—78 |

FOREIGN PATENTS

| | | |
|---|---|---|
| 642,260 | 6/1962 | Canada. |
| 804,504 | 11/1958 | Great Britain. |

WILLIAM H. SHORT, *Primary Examiner.*

S. LEON BASHORE, *Examiner.*

H. D. ANDERSON, *Assistant Examiner.*